United States Patent [19]
Garcea

[11] 3,910,040
[45] Oct. 7, 1975

[54] DEVICE FOR DETECTING THE OVERHEATING OF A CATALYST TRAVERSED BY THE EXHAUST GAS OF AN EXPLOSION ENGINE

[75] Inventor: Giampaolo Garcea, Milan, Italy

[73] Assignee: Alfa Romeo S.p.A., Milan, Italy

[22] Filed: Feb. 26, 1974

[21] Appl. No.: 445,904

[30] Foreign Application Priority Data
Feb. 28, 1973 Italy .................................. 21040/73

[52] U.S. Cl. ................ 60/277; 23/288 FA; 60/288; 60/289; 340/229
[51] Int. Cl.[2] ......................................... F01N 3/14
[58] Field of Search ...... 60/277, 289, 288; 340/229, 340/57, 52 F, 237, 239; 23/288 F, 288 FA

[56] References Cited
UNITED STATES PATENTS
3,503,716  3/1970  Berger ................................. 60/277
3,766,536  10/1973  Hile ..................................... 60/277
3,783,619  1/1974  Alquist ................................ 60/288
3,829,294  8/1974  Smith .................................. 60/288

*Primary Examiner*—Douglas Hart
*Attorney, Agent, or Firm*—Waters, Schwartz & Nissen

[57] ABSTRACT

In systems for the post-combustion of the exhaust gases of internal combustion engines, of the type comprising a catalyst mass for promoting the post-combustion reactions, a sensing device is provided to sense the possible improper operation of the catalyst mass due to overheating; the sensing device is of the pressure type, responsive to variations of the pressure drop occurring in the exhaust gases upon passing through the catalyst mass, since these variations are a function of the temperature conditions existing in the catalytic mass.

14 Claims, 6 Drawing Figures

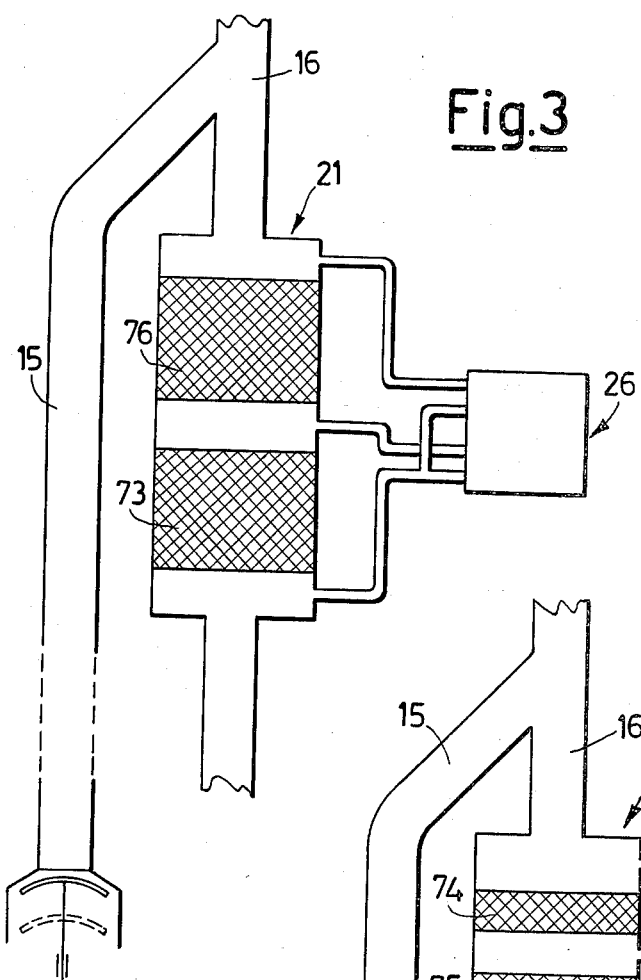
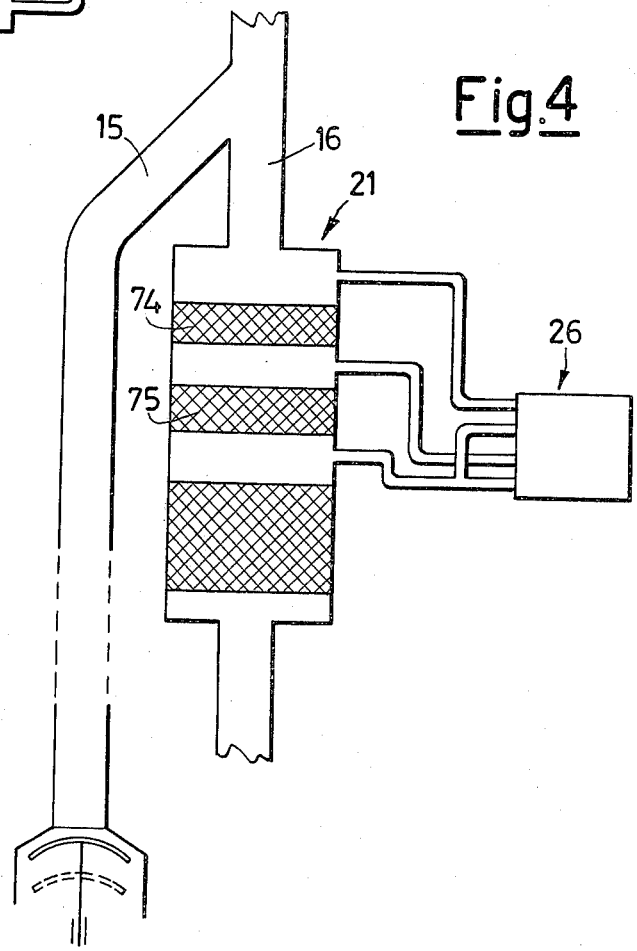

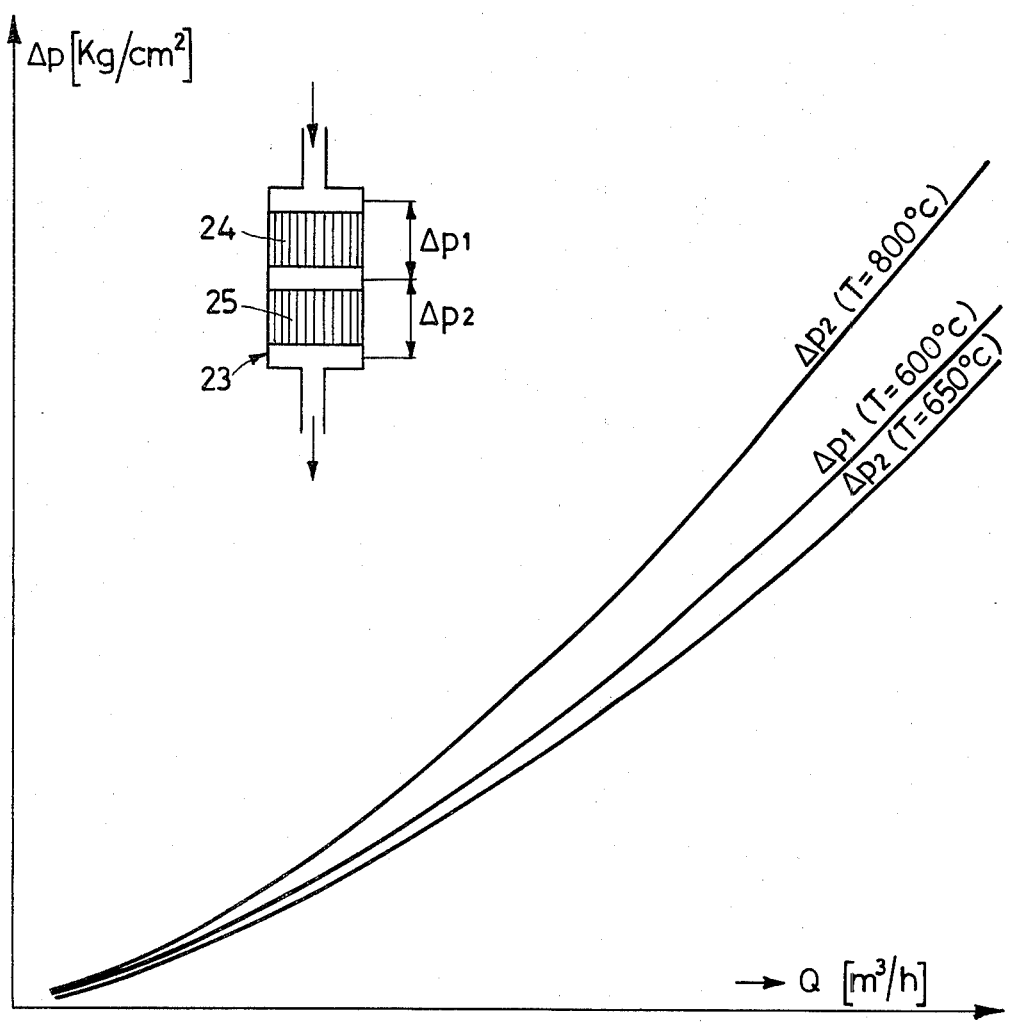

DEVICE FOR DETECTING THE OVERHEATING OF A CATALYST TRAVERSED BY THE EXHAUST GAS OF AN EXPLOSION ENGINE

Catalysts for insertion into the exhaust pipe of an explosion engine have been under study for some time for wide application in the automobile field; determined chemical reactions are promoted between the components of the exhaust gas (possibly mixed with external air) in said catalysts above a certain temperature, so as to reduce the quantity of pollutant compounds emitted into the atmosphere.

However if the temperature of the catalyst exceeds determined values the catalyst is damaged or destroyed. Overheating can occur when the gas upstream of the catalyst contains a too high percentage of components which react chemically in the catalyst, liberating a too high quantity of heat.

If the gas enters the catalyst mixed with a flow of external air to favour post combustion, the disadvantage can be caused by a defect in the systems regulating the mixture of air and petrol taken in by the motor, so as to give considerable enrichment of the mixture; the disadvantage can also derive from defective ignition or faulty combustion of the mixture in the explosion chamber, so that the reactions (exothermic) which have not taken place in the explosion chamber take place in the catalyst and the quantity of heat which has not been liberated in the thermal cycle of the engine (where it is transformed into useful power) is liberated in the catalyst.

In these cases, to avoid damage or destruction of the costly catalyst, and to also avoid the danger which can derive from the sudden stoppage of the engine because of obstruction of the exhaust pipe, devices are being studied or have already been constructed for indicating to the driver of the vehicle (for example by means of an indicator lamp on the dashboard) that the catalyst is overheating; other devices on the other hand provide for the automatic operation of valves which deviate the flow of exhaust gas so that it does not traverse the catalyst (automatic bypass).

These indication or automatic intervention devices are generally based on the use of a temperature sensor (for example a thermocouple or resistance thermometer) disposed within the catalytic mass or downstream of the catalyst; when the temperature measured exceeds a determined safety value the device signals or automatically intervenes.

It has however been found that it is extremely difficult to obtain a sensor of sufficiently rapid response to avoid damaging or destroying the catalyst. The porous ceramic support on which the catalysing element or compound is deposited is very light and its specific heat is very low; thus the temperature rise is very rapid in the aforementioned cases of sudden defective operation of the engine, whereas the sensor element with its necessary protection sheath has always its own thermal inertia, which gives rise to a delay in indication; on the other hand miniaturising the sensor and eliminating its protection sheath make the sensor too delicate, so that it too frequently becomes damaged.

This problem is resolved according to the present invention by avoiding the use of the temperature sensor, replacing it by a pressure sensor.

The conception of this new device is derived from ascertaining the type of flow of the gas which traverses the catalyst, and from considerations of a physical law which is applied to this type of flow. The flow of gas which traverses the catalyst is essentially of the viscous type over the entire field of use of the catalysts normally installed in a motor vehicle. This is so whether the catalyst support consists of a layer of porous ceramic granules, or whether it consists of a monolithic element of porous ceramic provided with thin parallel channels travelled by the gas. In accordance with the said physical law for this type of flow, the pressure drop of the gas depends both on its flow rate and on its viscosity, and as the viscosity of gases increases with their temperature, the pressure drop of the gas for equal flow rates when traversing a viscous matrix, (in our case the catalyst) is an increasing function of the gas temperature.

This gives the possibility of checking the value of gas temperature by checking pressure, it being obvious that pressure variations occur simultaneously with temperature variations.

The pressure sensor, which thus replaces the temperature sensor, may be disposed at a suitable distance from the catalyst and from the exhaust pipe to avoid difficulties deriving from the high temperatures. As pressure variations are transmitted in gases at the speed of sound, the delay due to the length of the small connection pipes is only of a few thousandths of a second.

However at this point a difficulty had to be overcome. A simple check of viscous pressure drop as heretofore stated would be a sufficient indication of the temperature only if the flow rate of gas in terms of weight was always the same. However the flow rate of exhaust gas from the engine is variable with the working power of the engine. It was therefore thought to compare said viscous pressure drop, a function of the flow rate and temperature increase of the gas in the catalyst, with another pressure drop, a function of the flow rate but not of the pressure increase, so as to isolate the effect of the temperature increase. Obviously the two pressure drops, compared one to the other so as to measure the difference, are those suffered by the gas at equal flow rates, for example passing the same flow rate of gas successively through two viscous matrix elements. The device thus comprises a first and second viscous matrix element disposed in series and traversed by exhaust gas, the gas undergoing a first and second pressure drop, in said elements in the first of said elements the gas not undergoing temperature rise if the aforementioned defects of mixture adjustment or ignition occur, in the second of said elements the gas undergoing a temperature rise by the effect of further combustion during said occasions; this happens because the first element consists of a chemically inert material, whereas the second consists of catalytic material, for example of the same type as used in the catalytic muffler or silencer. The device also comprises means sensitive to pressure drops undergone by the gas in traversing said elements; a signal being supplied by said sensitive means when, for a determined overheating of the second element, an increase occurs in the pressure drop undergone by the gas in traversing said second element.

In a preferred embodiment of the invention, the first element consists of inert support material the same as the support material for the catalyst which constitutes the second element, the behaviour of the two elements thus being similar from the viscous point of view.

Thus if because of a defect of engine operation, as heretofore stated, the gas becomes enriched in compounds which on reacting can liberate an excessive quantity of heat, this reaction does not take place when it traverses the inert support, and hence the pressure drop in said inert support does not increase; however the reaction takes place subsequently when the gas traverses the cell containing the catalyst, and hence the pressure drop increases in it because of the increase of viscosity with temperature, as heretofore stated.

Obviously according to the present invention the flow rate of gas which successively traverses the inert support and the catalyst can be the total flow rate of the gas leaving the engine; but it may also be only a fraction of the total flow rate.

The characteristics and advantages of the device will be more evident from the accompanying FIGS. 1 – 5, which show some embodiments of it by way of non-limiting example.

FIG. 3 and FIG. 4 show diagrammatically two further embodiments of the device;

FIG. 5 is a graph showing the characteristic operating curves of the device;

Figure 1:
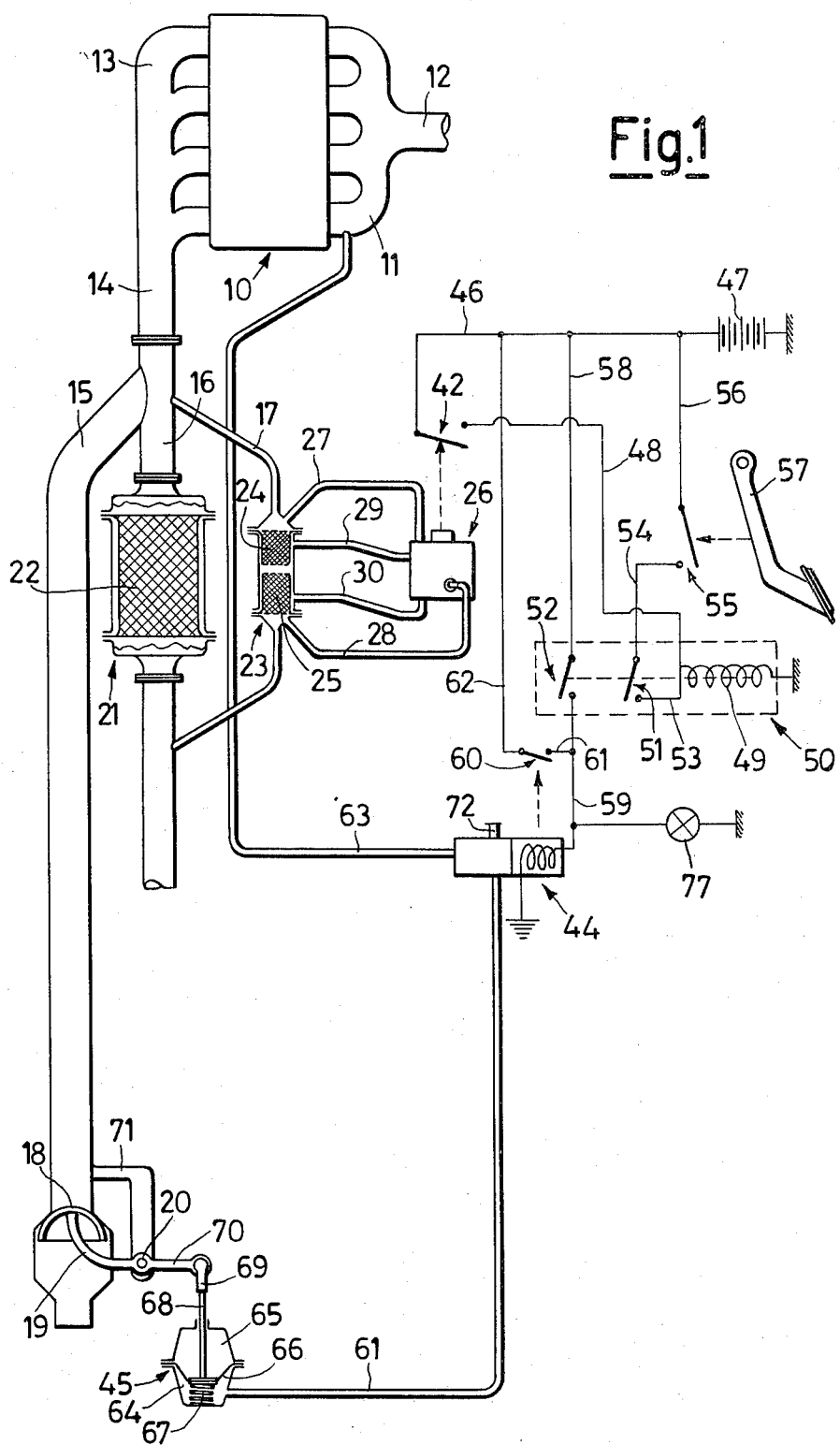
FIG. 1 shows an exhaust system for an explosion engine of a motor vehicle, the system being provided with a catalytic silencer; the device for detecting overheating of the catalyst according to the present invention is inserted into said system, in a particular embodiment.

FIG. 1 shows diagrammatically a four cylinder internal combustion engine indicated overall by the reference numeral 10; the figure shows the feed pipes 11 for the individual cylinders and a part of the intake manifold 12, the exhaust pipes 13 and the exhaust manifold 14. From the manifold 14 branch the main pipe 15, the auxiliary pipe 17. In the pipe 15 are generally inserted silencers, which are not shown here for simplicity; a shut-off valve, indicated by the reference numeral 18, is connected in the pipe 15 (in this particular case, close to the outlet to atmosphere); said valve 18 is rotatably supported at 20 by the bracket 71, by means of the arm 19.

In the auxiliary pipe 16, shown partially in the figure, the catalytic silencer 21 is inserted; the catalyst, of the chosen type, is indicated by the reference numeral 22; a shut-off valve (not shown) similar to the valve 18 can be also disposed in the pipe 16, close to the outlet to atmosphere, but controlled so that it operates in opposition to the latter valve.

The first member 23 of a first embodiment of the device according to the invention is inserted in the small pipe 17, which branches from the pipe 16 upstream of the silencer 21 and flows into the same pipe downstream of the silencer; said first member consists of a small silencer which contains a first cell of inert material 24, of the viscous matrix type or of such a permeability as to determine a substantially laminar and hence viscous flow, and a second viscous matrix cell of catalytic material 25 (for example of the same type as the catalyst 22). A pressure sensor, indicated overall by the reference numeral 26, enables the pressure drops of the gas in passing through the cell 24 and through the cell 25 to be measured and compared, said sensor being connected by the tube 27 to that zone of the silencer 23 upstream of the cell 24, by the tubes 29 and 30 to the intermediate zone between the two cells 24 and 25, and by the tube 28 to the zone downstream of the cell 25.

Figure 2:
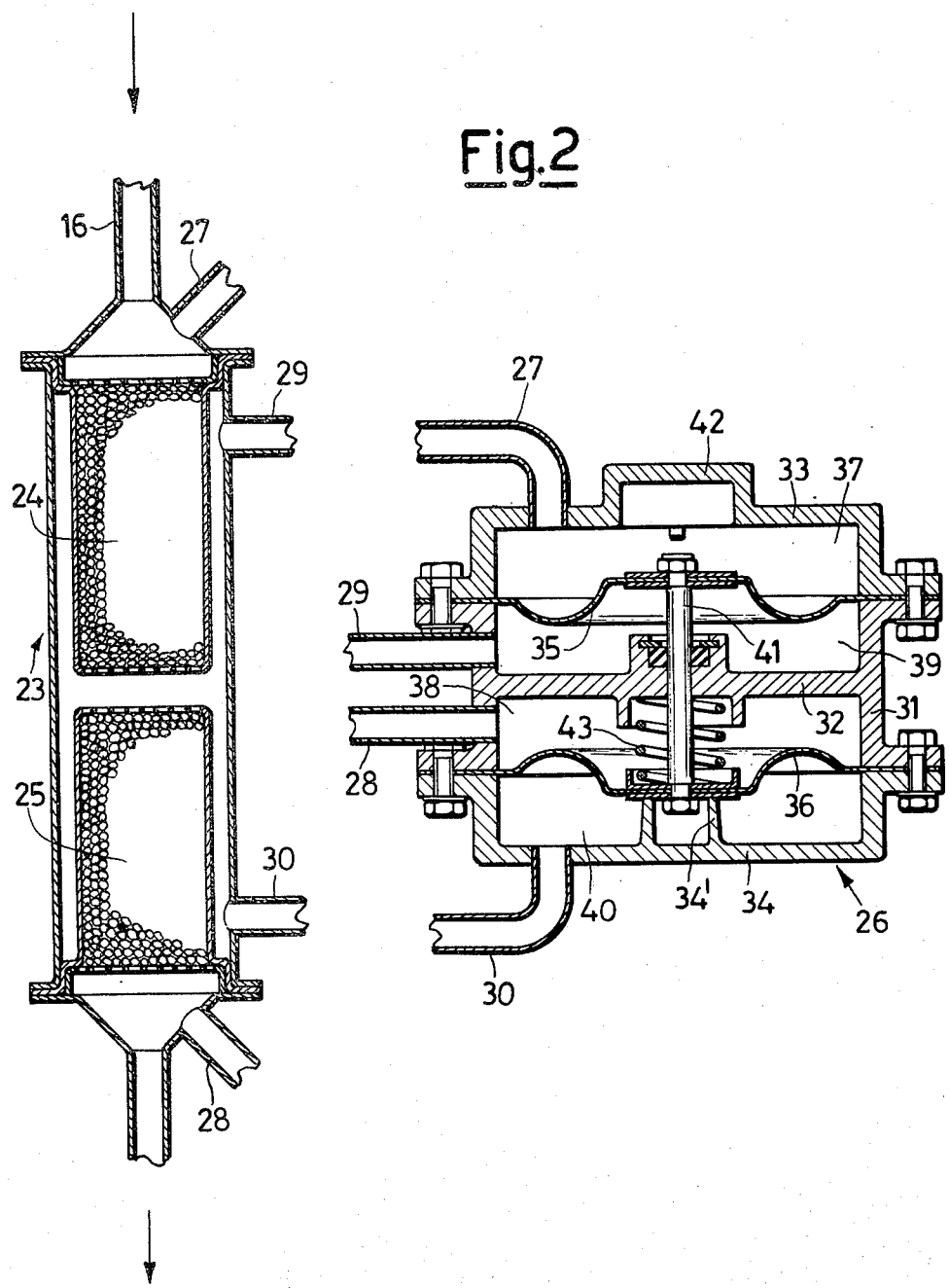
FIG. 2 shows a detail of the device to an enlarged scale.

The pressure sensor 26 is represented in detail, together with the small silencer 23, in FIG. 2. The rigid part of said sensor is composed, in this particular case, of an intermediate support 31 comprising the wall 32 and two covers 33 and 34 flanged to the intermediate support together with two membranes 35 and 36 which separate the chamber 37 from the chamber 39 and the chamber 38 from the chamber 40 respectively. The central rigid portions of the membranes 35 and 36 are rigidly connected together by the rod 41 which tightly traverses the wall 32 and can engage with the electric snap microswitch 42 arranged inside the housing of the sensor 26. A return spring 43 acts on the membrane 36; this spring may not be necessary if the relative dimensions of the cells 24 and 25 are suitably chosen. The microswitch 42, as shown in FIG. 1, is connected in the supply circuit of the solenoid valve 41 which controls the actuator 45 of the shut-off valve 18 for the pipe 15. FIG. 2 does not show the two electric cables which, connected to the microswitch, pass to the outside through the cover 33.

The mobile contact of the microswitch 42 is connected to the wire 43 from the battery 47 of the motor vehicle, the fixed contact of this microswitch being connected by the wire 48 to the solenoid 49 of the relay 50, comprising the switches 51 and 52, and also by the wire 53 to the fixed contact of the switch 51.

The mobile contact of the switch 51 is connected by the wire 54 to the fixed contact of the switch 55, the mobile contact of which is connected in its turn by the wire 56 to the wire 46. The switch 55 is operated by the accelerator pedal 57 of the motor vehicle in such a manner that it is opened when the pedal is released.

The mobile contact of the switch 52 is connected by the wire 58 to the wire 46, and its fixed contact is connected by the wire 59 to the indicator lamp 77 and to the solenoid of the solenoid valve 44. The switch 60 is operated by a device sensitive to the rotational speed of the engine (not shown), for example a centrifugal device which causes it to close when the r.p.m. of the engine exceeds a predetermined value; the fixed contact of the switch 60 is connected by the wire 61 to the wire 59, and its mobile contact is connected by the wire 62 to the wire 46.

The solenoid valve 44 connects the small pipe 61 either to the breather pipe 72 or to the small pipe 63 branching from the intake manifold 12, downstream of the throttle members; thus the pressure in the chamber 64 of the actuator 45 depends on the position of the solenoid valve 44, whereas the pressure in the chamber 65, which is separated from the latter by the membrane 66, is atmospheric.

A spring 67 acts on the membrane 66 and a rod 68 rigid with the membrane is connected by the link rod 69 to the lever 70 rigid with the arm 19 of the valve 18.

The operation of the device described is as follows: when the engine runs at low and medium power and in a regular manner, as the pipe 15 is shut by the valve 18, the exhaust gas is conveyed by the manifold 14 to the auxiliary pipe 16 and catalytic silencer 21 where it undergoes recombustion (generally the air necessary for the reaction is injected into the exhaust gas upstream of the silencer). A small part of the engine exhaust gas (with a flow rate which depends upon sizing) flows into the small pipe 17 and through the small silencer 23; the gas does not undergo chemical reaction in the inert material cell 24, whereas in the catalytic cell 25 it undergoes recombustion. The pressure drops of the gas both in flowing through the catalyst 22 and through the cells 24 and 25 are substantially of the viscous type and vary with temperature.

In order to better clarify the operation of the device, FIG. 5 shows by way of example, curves relative to the pressure drops $\Delta p$ undergone by the gas in flowing through the cells 24 and 25 of the small silencer 23, as the gas flow rate is varied. The curve indicated by $\Delta p_1$ (T = 600°C) refers to the pressure drop undergone by the gas, supposed at 600°C, through the first cell 24 (inert support) with preferential sizing of the cell. The curve $\Delta p_2$ (T = 650°C) refers to the pressure drop undergone by the gas in subseqent flow through cell 25 (catalyst) supposing a temperature of 650° (the increase in temperature from 600° to 650° is that which the gas undergoes for the post combustion within the catalytic cell 25 when the engine functions normally). For equal flow rates through the two cells, because of the suitable sizing of the cell 25 with respect to the cell 24 (this sizing refers evidently to the thickness of the cells in the direction of flow of the gas), values are obtained for $\Delta p_1$ which are always greater than $\Delta p_2$; consequently the resultant of the pressures on the two membranes 35 and 36 of FIG. 2 is a force directed downwards, so that the rod 41 is kept against the bottom of its stroke 34'. The curve $\Delta p_2$ (T = 800°C) refers instead to the pressure drop which the gas undergoes, flowing through the catalytic cell 25, when its temperature reaches 800°C because of the possible post combustion of a high quantity of unburnt products (i.e., lack of ignition etc. in the case of an abnormal mixture taken in by the engine). As $\Delta p_2$ (T = 800°C) is always greater than $\Delta p_1$ (T = 600°C) the resultant of the pressures on the two membranes 35 and 36 of FIG. 2 is in this case a force directed upwards, so that the rod 41 is moved and operates the microswitch 42 so as to close its contact.

With the closure of the microswitch 42, the solenoid 49 of the relay 50 is supplied by the battery through the wires 46 and 48; the switches 51 and 52 of the relay close and the solenoid of the solenoid valve 44 is energised, so moving the plug from the position in which it connects the small pipes 61 and 63 together, to the position in which it connects the small pipe 61 to the breather pipe 72. As the forces due to the pressures on the faces of the membrane 66 of the actuator 45 balance, the said membrane moves under the action of the spring 67 together with the rod 68, which rotates the lever 70 and hence the valve 18 about the pivot 20, so opening the outlet to atmosphere of the main pipe 15.

The exhaust gas from the engine flows to atmosphere through the pipe 15, bypassing the silencer 21 and preventing the catalyst from becoming damaged by overheating.

The particular electric circuit controlled by the microswitch prevents the microswitch 42 and hence the valve 18 immediately closing at this point as soon as the gas has been deviated, through the lowering of temperature and fall in pressure in the cells 24 and 25 (which are no longer traversed by the gas). In fact, with said circuit, even if the gas temperature falls and the rod 41 of the sensor 26 returns to the rest position, so opening the microswitch 42, the gas continues to flow from the pipe 15 until the accelerator pedal 57 is released; this happens because the switch 52 remains closed and the solenoid of the solenoid valve 44 remains energised, as the solenoid 49 of the relay 50 is supplied by the wires 46, 56, 54 and 53 because of the closure of switches 51 and 55; the switch 55 in fact closes when the accelerator pedal is pressed and opens when it is released.

In the embodiment of FIG. 1 the silencer 21 is by-passed and the valve 18 leaves the outlet to atmosphere of the pipe 15 free even when the engine, though functioning normally, delivers very high power. Under these conditions the supply circuit for the solenoid of the solenoid valve 44 (wires 46, 62, 61 and 59) is closed by the switch 60; the switch 60 is operated by a device sensitive to the power delivered by the engine, for example a centrifugal device as stated, which closes the switch 60 when the r.p.m. of the engine exceeds a predetermined value; in this case the solenoid valve 44 also connects the small pipe 61 to the breather pipe 72 so causing movement of the membrane 66 of the actuator 45 and hence the opening of the valve 18.

The indicator lamp 77, which may be arranged on the dashboard or possibly on the outside of the vehicle, indicates that the exhaust gas is bypassing the catalytic silencer when it lights.

FIGS. 3 and 4 show variations of the device for detecting overheating of a catalyst according to the present invention; in neither case is a small silencer (such as the silencer 23 of FIG. 1) used for measuring gas temperature by means of pressure drops; the main catalytic silencer is used instead for this purpose; in the silencer 21 of FIG. 3 there is a cell of inert material 76 in series with the catalyst 73, and the pressure sensor 26 is connected to the same silencer 21; in the silencer 21 of FIG. 4 there are two cells, in series with the actual catalyst; one cell, 74, is of inert material and the other, 75, is of catalytic material; the pressure sensor is connected to the silencer 21 in such a manner as to measure the pressure drops of the gas through said cells 74 and 75.

Figure 6:
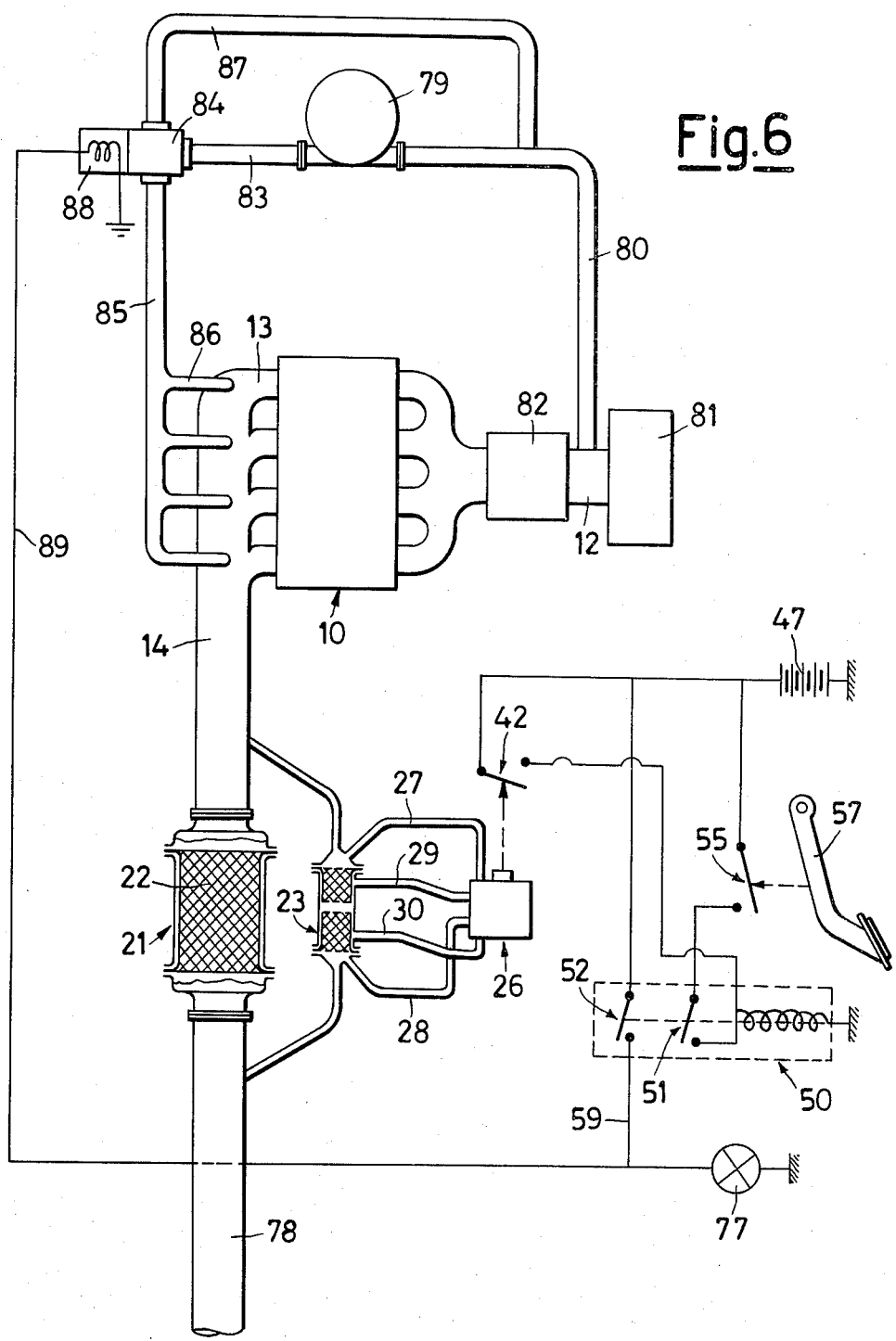
FIG. 6 shows diagrammatically a further embodiment of the device.

FIG. 6 shows a variation of the system illustrated in FIG. 1 and like elements are shown by the same reference numbers.

In this case the engine 10 is provided with only one exhaust pipe 78 comprising a catalytic silencer 21 and possibly silencing mufflers: the exhaust gases are thus passed through the silencer 21 before being discharged to the atmosphere. Such a solution is much simpler than that shown in FIG. 1 and thus it is preferable in the cases in which the catalytic material is capable of tolerating the greater thermal stresses consequent to the permanent flow of the exhaust gases through the catalytic material and in those cases in which the greater back pressures existing in the exhaust system, upstream of the silencer, can be tolerated, at the higher operating powers, when the flow rate of the gases discharged from the engine is greater.

Before entering the silencer 21, the air needed for the post-combustion is injected into the gases, discharged from the engine; in this particular embodiment a volumetric pump 79 is used, by which air is sucked in through the duct 80 branched off the engine inlet duct 12, downstream of the filter 81 and upstream of the members 82 for the throttling of the air sucked in from the engine.

In the pump delivery duct 83 a three-way valve 84 is mounted, which is diagrammatically shown; the valve is connected to a duct 85, from which the injecting devices 86 are branched off and lead at the single exhaust pipes 13 of the engine, the pipe 87 for the recycle of the pump delivery being also connected to the duct 85, 88 indicates the electrical actuator of the valve 84, connected, through the conductor 89 to the conductor 59 and to the pilot lamp 77.

In this case the signal, indicating the overheating of the catalyst 22, which is supplied from the sensor 26 actuates the valve 84 and is used for the switching on of the pilot lamp 77.

When the post-combustion of the gases, in the silencer 21, takes normally place, no signal is originated from the sensor 26, the actuator 88 is not excited and the vent duct 87 is closed by the valve 84, the latter putting the duct 85 into communication with pump delivery duct 83: in the gas discharged from the engine the air needed for the post-combustion in the silencer 21 is injected.

On the contrary, in the case of improper post-combustion in the catalytic silencer, e.g. due to an excess of unburnt components in the exhaust gases originating from an erroneous dosing (gasoline excess) of the mixture sucked in by the engine, the sensor 26 provides a signal causing the switch 42 to be closed, and through the relay 50 controls the excitation of the actuator 88 of the valve 84 and of the pilot lamp 77.

The valve 84 then closes the duct 85 and connects the vent duct 87 with the delivery duct 83 of the pump 79.

The injection of air in the exhaust gases is stopped, the gases being thus fed to the silencer without the oxygen necessary for the post-combustion; thus the oxidizing reactions in the silencer are stopped and any damage of the catalyst due to the overheating is avoided.

The same electric current inducing the actuator 88 to be excited is fed to the pilot lamp 77, thus informing the driver about the already occurred interception of the post-combustion air feed to the exhaust gases. Therefore it is the post-combination air which is no more injected into the exhaust gases and is recycled to the intake of the pump 79, until the electric circuit is in the energized condition, i.e., until the acceleration pedal 57 is released.

What is claimed is:

1. In an exhaust system for an internal combustion engine, particularly for motor vehicles, provided with at least one muffler for the post combustion of the engine exhaust gas, a device for detecting excessive overheating of a catalyst contained in said muffler, said device comprising a first and second cell disposed in series and traversed by the engine exhaust gas, said cells containing solid but not compact material and hence being traversable by the gas, the gas undergoing a first and second pressure drop in said cells, the material contained in the second cell being a catalytic material, said detector device further comprising means sensitive to the pressure drops undergone by the gas in traversing said cells, a signal being supplied by said sensitive means when, for a determined overheating in said second cell, the pressure drop undergone by the gas in traversing said second cell exceeds a predetermined value.

2. A device as claimed in claim 1, in which said first and second cells are disposed in the exhaust system upstream of the catalytic muffler and are traversed by the entire engine exhaust gas.

3. A device as claimed in claim 1, in which said first and second cells are disposed inside the catalytic muffler, the entire engine exhaust gas traversing first the first cell, then the second cell, then the main catalytic bed of the catalytic muffler.

4. A device as claimed in claim 1, in which said first and second cells are disposed inside the catalytic muffler, the second cell being constituted by the main catalytic bed of the catalytic muffler itself, the entire exhaust gas traversing firstly the first cell and then the second cell.

5. A device as claimed in claim 1, in which said first and second cells are of smaller volume than the catalytic muffler, and are disposed in the exhaust system parallel to the catalytic muffler, the flow of engine exhaust gas being divided into two parts, the first of said parts being greater than the second and traversing the catalytic muffler, the second of said parts traversing firstly the first and then the second cell.

6. A device as claimed in claim 5 comprising small diameter pipes connecting said first and second cells to said means sensitive to the pressure drops undergone by the gas in traversing said cells, said sensitive means being spaced from said cells, said small diameter pipes having ports provided upstream and downstream of the first and second cells.

7. A device as claimed in claim 6, comprising a single container containing said first and second cells, the ports for said small diameter pipes being provided in the walls of said container.

8. A device as claimed in claim 1 in which said means sensitive to the pressure drops undergone by the gas in traversing said first and second cells provides a signal when, for the second pressure drop, a determined increase occurs with respect to the first pressure drop, said sensitive means then making a comparison between said first and second pressure drops.

9. A device as claimed in claim, 8 in which said signal is used for lighting an indicator lamp, indicating excessive overheating of the catalyst.

10. A device as claimed in claim 8, in which said signal is used for acoustically indiating, inside the motor vehicle passenger compartment, excessive overheating of the catalyst.

11. A device as claimed in claim 8, in which said signal is used for automatically controlling valve means which deviates the exhaust gas through a bypass around the catalytic muffler when excessive overheating occurs in said muffler, said deviation of the exhaust gas through the bypass giving at least one of the following indications: lighting an indicator lamp inside the vehicle, and giving an acoustic indication inside the vehicle, and lighting an indicator lamp visible on the outside of the vehicle.

12. A device as claimed in claim 11, in which said valve means is made to open said bypass around the catalytic muffler by said sensitive means, and is made to close said bypass only by other means sensitive to the working conditions of the engine.

13. A device as claimed in claim 11, in which said valve means which deviates the exhaust gas through the bypass around the silencer is also controlled by further means sensitive to parameters indicating the power delivered by the engine.

14. A device as claimed in claim 8, in which the said means sensitive to the pressure drops is operatively connected to valve means mounted in the pipe means, by which the air necessary for the post-combustion is fed to the engine exhaust gases, by opening in the exhaust system upstream of the catalytic muffler, said valve means being controlled by the signal originated from said sensitive means, so as to exclude the air from being fed to the exhaust gases.

* * * * *